Oct. 2, 1951     G. F. HEINE     2,570,123
DEVICE FOR FACILITATING THE CHECKING
OF STORAGE BATTERIES
Filed April 1, 1950
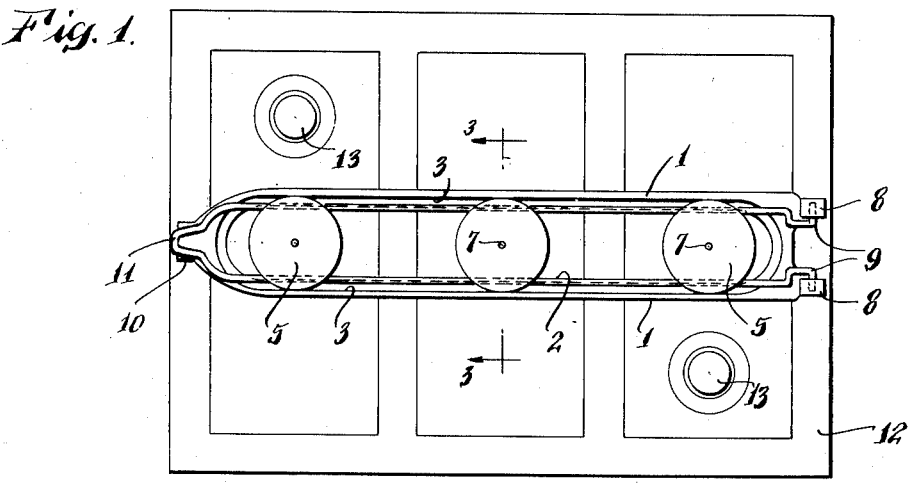
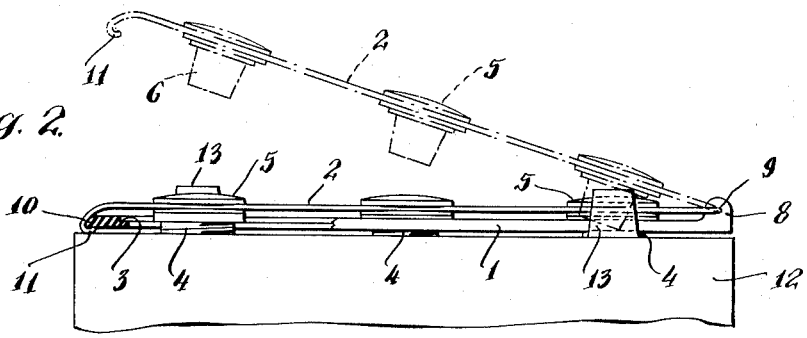
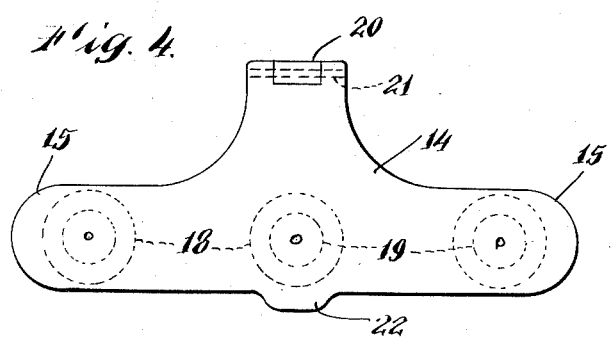
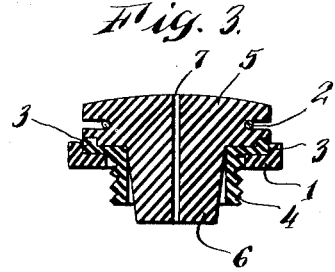
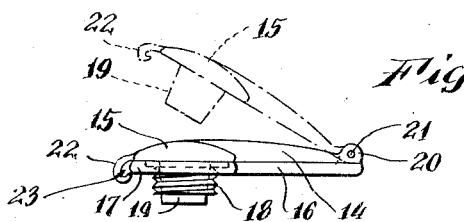
INVENTOR.
George F. Heine
BY Henry J. R. Metzler
ATTORNEY.

Patented Oct. 2, 1951

2,570,123

UNITED STATES PATENT OFFICE 2,570,123

DEVICE FOR FACILITATING THE CHECKING OF STORAGE BATTERIES

George F. Heine, Ferndale, Mich.

Application April 1, 1950, Serial No. 153,437

2 Claims. (Cl. 136—177)

The present invention relates to improvements in storage batteries and, more specifically, to a device for facilitating the checking and filling of batteries, which device I prefer to call a "battery quick check."

One object of the present invention is the provision of a device of the character described which is an improvement over, and a substitute for, the hitherto used threaded plugs each of which is screwed separately into a threaded opening at the top of a battery cell; the purpose of my improvement being to close all openings of all cells by one single device, which can be manipulated more easily and more quickly for opening and closing simultaneously all the cells without unscrewing and re-tightening an individual plug for each cell.

Another object of the present invention is the provision of a device of the character described which can be attached to new batteries while they are being manufactured, and which also can be attached to existing batteries without any structural changes of the batteries and without the use of any tools as well as without the application of any considerable amount of skill.

Still another object of the present invention is the provision of a device of the character described which is adjustable, so that one size of the device can be used in connection with batteries of different dimensions, thus making it possible to re-use the device after a battery has been exchanged for another battery of a different make, size, or capacity.

A further object of the present invention is the provision of a device of the character described which is light in weight, small in size, simple in construction and inexpensive to manufacture, but which is also sturdy, durable, and well adapted to withstand the rough usage to which devices of this type frequently are subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred forms of the invention have been shown.

In said drawing:

Figure 1 is a top plan view of a preferred embodiment of my invention as it appears when attached to a battery;

Fig. 2 is a side elevation of the same;

Fig. 3 is an enlarged sectional view on the line 3—3 of Fig. 1;

Fig. 4 is a top view of a modification; and

Fig. 5 is a side view of the modification of Fig. 4.

Similar reference characters refer to similar parts throughout the several views.

Referring first to Figs. 1 to 3 inclusive, the numeral 1 denotes a longitudinal base member, and the numeral 2 denotes a longitudinal cover member. The member 1 is made of any suitable insulating and acid-proof material, such as hard rubber, plastic material or the like, and has a longitudinal, preferably stepped slot 3. The numeral 4 denotes a plurality of ring members each of which has a top portion and a main portion whose outer diameter is smaller than that of the top portion. The members 4 have their main portions extended through the base member 1 and are of the same or of a similar material as the base member 1. A plug, having an annularly grooved top portion 5, a reduced, preferably conical main portion 6, and being provided with a vertical vent bore 7, is extended into each ring member 4 from above. The member 2 preferably is formed of a rod of plastic material, or the like, bent intermediate its ends to a substantial U-shaped formation to provide a bight and a pair of legs. One end of the base member 1 is provided with lug-shaped portions 8 into which are extended the outwardly bent terminals 9 of said legs, so as to hinge the member 2 to the member 1. The opposite end of the base member 1 preferably is provided with a tongue portion 10, and the bight 11 of the member 2 is bent partially around the tongue portion 10, so as to form a springy, catch-like detachable connection therewith. The main portions of the ring members 4 are externally threaded and adapted to be screwed into the threaded openings of a battery 12 in place of the hitherto customary battery plugs. Thus by first extending the ring members 4 through the base member 1 and then screwing them into the openings of the battery 12, the device can be attached easily and quickly to the battery 12. Since the members 4 are slidable as well as rotatable in the slot 3 of the member 1, they can be shifted thereon to positions in which they register with the openings in the top of a battery, so that this device is adjustable according to the designs and sizes of various makes of storage batteries. The leg portions of the member 2 engage opposite sections of the annular grooves in the top portions 5 of the plugs, so that the plugs also can be shifted to positions registering with the positions of the ring members 4.

If the device is in the position shown in full lines, all three openings of the battery 12 are closed. In order to open the same, the portion 11 is snapped out of engagement from the portion 10, and the cover member 2 is lifted, as shown in dash-and-dotted lines in Fig. 2. The size and shape of the device always will leave the battery terminals 13 unobstructed, as may be seen in Fig. 1.

If it is not necessary or desired to make an adjustable device as that shown in Figs. 1 to 3, the members 1 and 2 can be longitudinal plates, and the base member can be provided with holes for extending therethrough the ring members, while the plugs can be made as a unit with, or can be permanently attached to, the cover member. In this case the hinge can be at one end of the cover and base members, or it can be arranged in the manner shown in Figs. 4 and 5. There it will be seen that the cover member has a tongue portion 14 laterally extending intermediate its ends 15, and the base member has a similar tongue portion 16, registering with the tongue portion 14, extended intermediate the ends 17 of the base member. Ring members 18 are extended through perforations in the base member, and plugs 19, secured to the cover member, are extended through the ring members 18. The outer ends 20 of the tongue portions 14 and 16 are hinged to each other at 21, and opposite side tongue portions there is a springy hook portion 22 provided on the cover member, and a cooperating extension 23 on the base member is adapted for being engaged by the hook portion 22 while the battery is closed.

If new batteries, while they are being manufactured, are to be provided with my new and improved device, the cover member can be hinged directly to the top of the battery and provided with plugs which fit tightly into non-threaded holes in the top of the battery.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A device of the character described comprising a base member having a longitudinal main portion provided with a longitudinfial slot and having lug-shaped portions at one end, a cover member formed of a rod bent intermediate its ends to a substantial U-shaped formation to provide a bight and a pair of leg portions whose terminals are bent outwardly and extended into the lug-shaped portions of said base member, a plurality of ring members each of which has a top portion and a main portion whose outer diameter is smaller than that of the top portion having their main portions extended through the slot in said base member, and a plurality of plugs having lower portions that fit into said rings and upper portions provided with annular grooves opposite sections of which are engaged by opposite leg portions of said cover member, ring members having at their main portions external threads adapted for engaging the threaded openings in the top of a storage battery, and said plugs being provided with vertical bores extended therethrough.

2. A device of the character described comprising a longitudinal base member provided with a longitudinal slot, a cover member being hinged to said base member, a plurality of externally threaded ring members being extended through the slot of said base member and being rotatable as well as slidable therein, and a plurality of plugs adapted to fit into said rings being slidably attached to said cover member, said ring members being adapted to be screwed into threaded openings in the top of a battery, and said plugs being provided with vent holes.

GEORGE F. HEINE.

REFERENCES CITED

The following references are of record in the file of this patent:

UNITED STATES PATENTS

| Number | Name | Date |
| --- | --- | --- |
| 1,978,449 | Codney | Oct. 30, 1934 |
| 2,281,800 | Riedesel, Jr. | May 5, 1942 |
| 2,480,437 | Berg et al. | Aug. 30, 1949 |

FOREIGN PATENTS

| Number | Country | Date |
| --- | --- | --- |
| 98,176 | Sweden | Feb. 27, 1940 |
| 208,248 | Great Britain | Nov. 25, 1922 |
| 636,652 | France | Apr. 14, 1928 |